United States Patent Office 3,244,707
Patented Apr. 5, 1966

3,244,707
AMINOHALOALKENOLS AND METHOD OF PREPARATION
Rostyslaw Dowbenko, Gibsonia, Pa., assignor to Pittsburgh Plate Glass Company, Pittsburgh, Pa., a corporation of Pennsylvania
No Drawing. Filed Aug. 28, 1963, Ser. No. 305,202
11 Claims. (Cl. 260—247.7)

This invention relates to derivatives of halomethylhalohydrins and their method of preparation. More particularly, this invention relates to the reaction of di- and trihalomethylhalohydrins with amines and to the nitrogen-containing products of that reaction.

The halohydrins which constitute the starting material for the process of this invention correspond substantially to the formula:

(I) 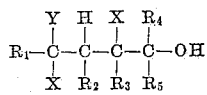

where Y is selected from the group consisting of bromine, chlorine and fluorine, X is selected from the group consisting of bromine and chlorine, $R_1$ is selected from the group consisting of bromine, chlorine, fluorine and lower alkyl radicals and where $R_2$, $R_3$, $R_4$ and $R_5$ are selected from the group consisting of hydrogen and alkyl radicals containing 1 to 10 carbon atoms. A method for preparing the compounds of Formula I is disclosed in copending application, Serial No. 228,239, filed October 4, 1962 now abandoned.

It has now been found that the above compounds (I) react with primary or secondary amines, eliminating HX to produce compounds corresponding to the formula:

(II) 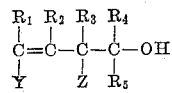

where Y and $R_1$, $R_2$ $R_3$, $R_4$ and $R_5$ are as defined above and where Z is a radical derived by removing a hydrogen atom from the amine nitrogen atom of an amine, said amine nitrogen atom having from 1 to 2 carbon to nitrogen bonds and from 1 to 2 nitrogen to hydrogen bonds. Preferably, the amine is a secondary amine containing 2 carbon to nitrogen bonds and 1 hydrogen to nitrogen bond. More preferably the amine is selected from the group consisting of morpholine, piperidine, pyrrolidine, N-methylpiperazine, hexamethyleneimine, diethylamine, di-n-propylamine, diisopropylamine, di-n-butylamine, N-methylethanolamine, diethanolamine, ethanolamine and ethylenediamine.

The amines which react with the halohydrins of Formula I to produce the compounds of this invention can be any primary or secondary amine. In other words the amine group contains at least one C–N bond and at least one N–H bond. Preferably, the amines are secondary amines, i.e., amines having an amine group containing two C–N bonds and one N–H bond. Preferably also, the amines utilized in preparing the compounds of this invention contain a total of 20 carbon atoms or less. Examples of primary amines which may be utilized to prepare the compounds of this invention are alkylamines such as ethylamine, butylamine and hexylamine, alkenylamines such as allylamine, alkanolamines such as ethanol amine, haloalkylamines such as beta-chloroethylamine, arylamines such as aniline, and alkylene diamines such as ethylenediamine. Examples of secondary amines which may be used to prepare the compounds of this invention include dialkylamines such as diethylamine, di-n-propylamine, diisobutylamine and dihexylamine, dialkenylamines such as diallylamine, dialkanolamines such as diethanolamine, dihaloalkylamines such as bis(beta-chloroethyl)amine and N,N'-dialkylalkylenediamines such as N,N' - dimethylethylenediamine. The secondary amines do not necessarily have to contain two identical substituents. Examples of such mixed amines include N-methylethanolamine, N-methylallylamine and N-methylaniline. Additional secondary amines include those amines in which the amine nitrogen is contained within a heterocyclic ring. Examples of such amines include morpholine, piperidine, pyrrolidine, N-methylpiperazine, hexamethyleneimine, and thiomorpholine. As it may be seen from the above, the heterocyclic amine may contain additional hetero atoms, for example, nitrogen, oxygen or sulfur.

The reaction conditions employed to produce the products of this invention vary widely. For example, the reaction may be carried out at ordinary room temperature (about 25° C.), although somewhat elevated temperatures may be used to induce faster reaction rates. Preferably, the reaction is carried out at a temperature between about 50° C. and about 150° C. or higher, depending upon the reactivity and stability of the particular reactants and products involved in the reaction.

The proportion of reactants utilized may also be varied widely. However, to obtain the highest yield of the desired product, it is desirable to use at least about 4 moles and preferably at least about 3½ moles of the primary or secondary amine since 2 moles of hydrogen halide are produced in the reaction. However, if desired, up to 2 moles of the amine may be replaced by a hydrogen halide acceptor such as a tertiary amine. Where less than 3 moles of the amine are employed the desired product may be in the form of its hydrogen halide and in order to obtain the free amine, neutralization of the hydrogen halide with potassium carbonate or other base may be necessary.

The reaction of the halomethylhalohydrin and the amine is usually conducted in the absence of a solvent or diluent. However, if desired the reaction may be carried out in the presence of an inert solvent or diluent such as benzene, toluene, ketones or ethers.

The compounds of this invention may be recovered from the reaction mixture by conventional techniques known to the organic chemist. Usually the reaction yields a mixture of the desired product and an amine hydrohalide. Ordinarily, the amine hydrohalide is relatively insoluble in the reaction mixture and can be removed by filtration. Another method of separating the amine hydrohalide from the desired product is to dissolve the reaction mixture in a suitable solvent and extract the amine hydrohalide with water. Still another method is to neutralize the amine hydrohalide with a suitable base, such as potassium carbonate and separate the resulting free amine from the desired product, on the basis of their differing physical properties, by means of extraction, crystallization or distillation. In some instances the products crystallize out of solution and may be purified by recrystallization with appropriate solvents. When a solvent is used in which the desired product is soluble, removal of the solvent by evaporation or vacuum distillation may render the product crystalline. This product may then be recrystallized if desired. Where the reaction mixture is liquid or a low melting solid, the products may be isolated by vacuum distillation, or by combined distillation and recrystallization. Other techniques such as solvent extraction and chromatography may also be employed to isolate the products of this invention.

There are set forth below several examples which illustrate the method of producing the compounds of this invention and the manner in which such compounds were isolated and identified. These examples are, of course, given by way of illustration only and should not be construed as limiting the invention to the particular details thereof. All parts and percentages set forth, as is true throughout this specification, are by weight unless otherwise specified.

EXAMPLE I

*2-(N-morpholinyl)-4,4-dichloro-3-buten-1-ol*

To 87.1 grams (1.00 mole) of morpholine there was added dropwise with stirring, 20.2 grams (0.095 mole) of 2,4,4,4-tetrachlorobutanol, over a period of 30 minutes during which time the temperature was held below 30° C. The mixture was then gradually heated to 100° C. and stirred at this temperature for about 3 hours. The reaction mixture was then cooled and a solid was filtered off. The solid was washed with a small amount of ether and dried to obtain 25.0 grams (0.174 mole) of morpholine hydrochloride, melting point 173° C. to 175° C. Vacuum distillation of the filtrate gave 16.8 grams of the desired product, boiling point 110° C.–135° C. at 0.3 millimeter of mercury. Redistillation gave 15.1 grams of 2-(N-morpholinyl)-4,4-dichloro-3-buten-1-ol, boiling point 103° C.–106° C. at 0.2 millimeter of mercury. The product showed a strong hydroxyl band at 2.94 microns, a medium band at 6.22 microns and weak absorption at 5.6 to 6.1 microns in the infrared. The compound, a viscous yellowish oil was quite soluble in water.

*Analysis.*—Calculated for $C_8H_{13}Cl_2NO_2$:

| | Calculated (percent) | Found (percent) |
|---|---|---|
| Carbon | 42.44 | 42.76; 42.54 |
| Hydrogen | 5.79 | 6.02; 5.96 |
| Chlorine | 31.36 | 31.26; 30.98 |
| Nitrogen | 6.20 | 6.37; 6.40 |

EXAMPLE II

*2-(N-piperidyl)-4,4-dichloro-3-buten-1-ol*

To 85.2 grams (1.00 mole) of piperidine there was added 20.2 grams (0.095 mole) of 2,4,4,4-tetrachlorobutanol, dropwise over a period of 40 minutes. The resulting mixture was then heated at 100° C. for 4 hours, cooled and filtered. The solid was washed with a small amount of ether and dried to give 27.3 grams of piperidine hydrochloride, melting point 240° C.–241° C. Distillation of the filtrate gave 15.6 grams of a liquid, boiling point 95° C.–116° C. at 0.1 millimeter of mercury. This product was redistilled to obtain a yellowish viscous liquid, 2-(N-piperidyl)-4,4-dichloro-3-buten-1-ol, boiling point 85° C.–87° C. at 0.03 millimeter of mercury.

*Analysis.*—Calculated for $C_9H_{15}Cl_2NO$:

| | Calculated (percent) | Found (percent) |
|---|---|---|
| Carbon | 48.23 | 48.13; 48.31 |
| Hydrogen | 6.75 | 6.81; 6.92 |
| Chlorine | 31.63 | 31.42; 31.51 |
| Nitrogen | 6.25 | 6.28; 6.36 |

EXAMPLE III

*2[N-(N'-methylpiperazinyl)]-4,4-dichloro-3-buten-1-ol*

To a mixture of 31.5 grams (0.31 mole) of N-methyl piperazine and 25 milliliters of toluene, 20.2 grams (0.095 mole) of 2,4,4,4-tetrachlorobutanol was added dropwise with stirring. The resulting mixture was then heated to 100° C. for 5 hours, then cooled and filtered. The solid was washed with a small amount of benzene and dried, yielding 29.0 grams (0.213 mole) of N-methylpiperazine hydrochloride, melting point 136° C.–142° C. Removal of benzene and toluene from the filtrate and distillation of the residue gave 16.5 grams of a material boiling at 105° C.–130° C. at 0.5 millimeter of mercury. This product was then redistilled to obtain 15.6 grams of a viscous oil, 2-[N-(N'-methylpiperazinyl)]-4,4-dichloro-3-buten-1-ol, boiling point 110° C. at 0.2 millimeter to 103° C. at 0.02 millimeter of mercury. The product showed broad absorption at 2.9 to 3.2 microns and a strong band at 6.22 microns in infrared.

*Analysis.*—Calculated for $C_9H_{16}Cl_2N_2O$:

| | Calculated (percent) | Found (percent) |
|---|---|---|
| Carbon | 45.18 | 44.91; 45.08 |
| Hydrogen | 6.74 | 6.69; 6.89 |
| Chlorine | 29.64 | 29.67; 29.51 |
| Nitrogen | 11.71 | 11.61; 11.53 |

EXAMPLE IV

*2-[N-methyl-N-(2-hydroxyethyl)amino]-4,4-dichloro-3-buten-1-ol*

To 37.5 grams (0.50 mole) of N-methylethanolamine was added 20.2 grams (0.095 mole) of 2,4,4,4-tetrachlorobutanol, dropwise, with stirring. The mixture was then heated to 80° C., whereupon the temperature rose to 100° C. and was held at 100° C. and heated for 5 hours, then cooled. The reaction mixture was dissolved in water and solid potassium carbonate was added. Two layers were formed. The heterogeneous mixture was then extracted with diethyl ether. The extract was dried over magnesium sulfate and the ether evaporated on a steam bath, yielding 29.7 grams of a liquid. The liquid was then distilled, yielding 21.5 grams of a material boiling from 37° C. at 0.4 millimeter of mercury to 140° C. at 0.3 millimeter of mercury. Redistillation yielded a fraction containing 13.3 grams of 2-[N-methyl-N-(2-hydroxyethyl)amino] - 4,4 - dichloro - 3-buten-1-ol, boiling point 111° C.–115° C. at 0.2 millimeter of mercury. The product had a strong band at 3.0 microns, a medium band at 6.20 microns and a weak band at 6.05 microns in the infrared.

*Analysis.*—Calculated for $C_7H_{13}Cl_2NO_2$:

| | Calculated (percent) | Found (percent) |
|---|---|---|
| Carbon | 39.27 | 39.35; 39.14 |
| Hydrogen | 6.12 | 6.23; 6.08 |
| Chlorine | 33.12 | 33.10; 33.24 |
| Nitrogen | 6.54 | 6.53; 6.45 |

EXAMPLE V

*2-(N,N-dibutylamino)-4,4-dichloro-3-buten-1-ol*

To 258 grams (2 moles) of di-n-butylamine was added 101 grams (0.475 mole) of 2,4,4,4-tetrachlorobutanol, dropwise, with stirring. The mixture was then heated at 100° C. for a total of 5 hours, cooled and filtered. The solid material was washed with a small amount of benzene and dried to give 129.7 grams of di-n-butylamine hydrochloride, melting point 285° C.–287° C. (with decomposition). The benzene was removed from the filtrate under vacuum and the residue distilled to yield 181.8 grams of a material boiling at 35° C. at 0.7 millimeter of mercury to 140° C. at 0.3 millimeter of mercury. This material was redistilled to obtain a fraction boiling at 90° C. at 2 millimeters of mercury to 100° C. at 0.2 millimeter of mercury; weight 12.2 grams. The distillate was dissolved in ether and washed with water 3 times. The ether layer was dried over magnesium sulfate. The ether was then removed and the residue distilled to yield 55.8 grams of 2-(N,N-dibutylamino)-4,4-dichloro-3-buten-1-ol, boiling point 105° C.–106° C. at 0.5 millimeter of mercury.

Analysis.—Calculated for $C_{12}H_{23}NCl_2O$:

|  | Calculated (percent) | Found (percent) |
|---|---|---|
| Carbon | 53.73 | 53.51 |
| Hydrogen | 8.64 | 8.52 |
| Chlorine | 26.43 | 25.68 |
| Nitrogen | 5.22 | 4.88 |

EXAMPLE VI

The reaction of 2,4,4,4-tetrachlorobutanol with ethylenediamine, conducted and isolated in the manner of Example IV yielded 2-[N-(2-aminoethyl)]-4,4-dichloro-3-buten-1-ol, boiling point 132° C.–138° C. at 0.2 millimeter of mercury.

EXAMPLE VII

2[N-(2-hydroxyethyl)amino]-4,4-dichloro-3-buten-1-ol

To 61.1 grams (1.00 mole) of ethanolamine was added 40.4 grams (0.19 mole) of 2,4,4,4-tetrachlorobutanol, dropwise, with stirring. The reaction was exothermic. After the addition was completed the reaction was heated to 100° C. and maintained at 100° C. for a total of 11.5 hours and then cooled. The reaction mixture was then evaporated down under a vacuum of 15–20 millimeters of mercury on a steam bath. The residue was then dissolved in 200 cubic centimeters of water and solid potassium carbonate added. Two layers were formed. The mixture was then extracted with diethylether. The ether extract was then dried over magnesium sulfate and then filtered. The filtrate was then evaporated down on a steam bath to yield 39.8 grams of residue. The residue was then vacuum distilled to yield a fraction boiling at 130° C.–160° C. at 0.2 millimeter of mercury (with slight decomposition). Upon redistillation 20.2 grams of 2-[N-(2-hydroxyethyl)-amino] - 4,4 - dichloro-3-buten-1-ol, boiling point 134° C.–135° C. at 0.2 millimeter of mercury (with slight decomposition) was obtained. The infrared spectrum showed a strong band at 3.05 microns and a medium band at 6.19 microns.

Analysis.—Calculated for $C_6H_{11}Cl_2NO_2$:

|  | Calculated (percent) | Found (percent) |
|---|---|---|
| Carbon | 36.02 | 36.15; 36.16 |
| Hydrogen | 5.54 | 5.52; 5.40 |
| Chlorine | 35.44 | 35.22; 35.31 |
| Nitrogen | 7.00 | 7.24; 7.10 |

The compounds of this invention contain an amine group, and accordingly find utility as neutralizing agents for acids such as hydrochloric acid. These compounds are also useful as chemical intermediates since they contain a reactive amine group, hydroxyl group and dichloromethylene group rendering the products of this invention versatile building blocks for more complex molecules. For example, the hydroxyl group may be esterfied or etherified. Thus, the compounds of this invention may be reacted with acrylyl chloride or methacrylyl chloride, for example, to produce unsaturated monomers which may be homopolymerized or copolymerized with other unsaturated monomers such as ethyl acrylate, methyl methacrylate or styrene to produce polymers which are useful as decorative and protective coatings for wood and metal. Further, the compounds of this invention may be used as pesticides, for example, insecticides, fungicides, or nematocides. The compounds of this invention may also be utilized as catalysts for the isocyanate-alcohol reaction to produce polyurethane coatings, castings, or foams.

Although specific examples of the invention have been set forth, it is not intended to limit the invention solely thereto, but to include all of the variations and modifications falling within the scope of the appended claims.

I claim:

1. A compound of the formula:

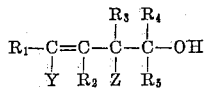

where Y is selected from the group consisting of chlorine, bromine and fluorine, $R_1$ is selcted from the group consisting of chlorine, bromine, fluorine and lower alkyl radicals, $R_2$, $R_3$, $R_4$ and $R_5$ are individually selected from the group consisting of hydrogen and alkyl radicals containing 1 to 10 carbon atoms, and Z is a radical derived by removing a hydrogen atom from the amine nitrogen atom of an amine selected from the group consisting of lower alkyl and lower hydroxyalkyl-substituted primary and secondary amines containing 1 to 20 carbon atoms, morpholine, piperidine, pyrrolidine, N-methylpiperazine and hexamethyleneimine.

2. A compound as in claim 1 wherein $R_1$ and Y are chlorine.

3. A compound as in claim 2 wherein the amine is a secondary amine.

4. 2-(N-morpholinyl)-4,4-dichloro-3-buten-1-ol.

5. 2-(N-piperidyl)-4,4-dichloro-3-buten-1-ol.

6. 2 - [N - (N'-methylpiperazinyl)] - 4,4-dichloro - 3- buten-1-ol.

7. 2 - [N-methyl - N - (2-hydroxyethyl)amine] - 4,4-dichloro-3-buten-1-ol.

8. 2 - (N,N-dibutylamino) - 4,4 - dichloro - 3 - buten-1-ol.

9. A method of preparing a compound of the formmula:

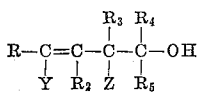

where Y is selected from the group consisting of chlorine, bromine and fluorine, $R_1$ is selected from the group consisting of chlorine, bromine, fluorine and lower alkyl ardicals, $R_2$, $R_3$, $R_4$ and $R_5$ are individually selected from the group consisting of hydrogen and alkyl radicals containing 1 to 10 carbon atoms, and Z is a radical derived by removing a hydrogen atom from the amine nitrogen atom of an amine selected from the group consisting of lower alkyl and lower hydroxyalkyl-substituted primary and secondary amines containing 1 to 20 carbon atoms, morpholine, piperidine, pyrrolidine, N-methylpiperazine and hexamethyleneimine, which comprises reacting a halomethylhalohydrin corresponding to the formula:

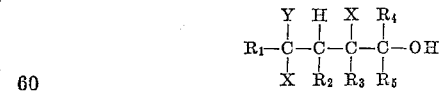

where Y is selected from the group consisting of bromine, chlorine and fluorine, X is selected from the group consisting of bromine and chlorine, fluorine and lower alkyl radicals, and where $R_2$, $R_3$, $R_4$ and $R_5$ are selected from the group consisting of hydrogen and alkyl radicals containing 1 to 10 carbon atoms, with at least about 3 moles per mole of the halomethylhalohydrin of an amine selected from the group consisting of lower alkyl and lower hydroxyalkyl-substituted primary and secondary amines containing 1 to 20 carbon atoms, morpholine, piperidine, pyrrolidine, N-methylpiperazine and hexamethyleneimine, at a temperature of from about 25° C. to about 150° C.

10. A method of preparing a compound of the formula:

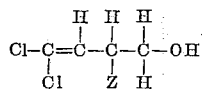

where Z is a radical derived by removing a hydrogen atom from a nitrogen atom of an amine selected from the group consisting of lower alkyl and lower hydroxyalkyl-substituted primary and secondary amines containing 1 to 20 carbon atoms, morpholine, piperidine, pyrrolidine, N-methylpiperazine and hexamethyleneimine, which comprises reacting 2,4,4,4-tetrachlorobutan-1-ol with at least about 3 moles per mole of the tetrachlorobutanol of an amine selected from the group consisting of lower alkyl and lower hydroxyalkyl-substituted primary and secondary amines containing 1 to 20 carbon atoms, morpholine, piperidine, pyrrolidine, N-methylpiperazine and hexamethyleneimine at a temperature of from about 25° C. to about 150° C.

11. A method as in claim 10 wherein the amine employed is a secondary amine.

References Cited by the Examiner

UNITED STATES PATENTS

| | | | |
|---|---|---|---|
| 2,533,084 | 12/1950 | Blicke | 260—294.7 |
| 2,561,516 | 7/1951 | Ladd et al. | 260—348 |
| 2,700,686 | 1/1955 | Dickey et al. | 260—633 |

OTHER REFERENCES

Fieser: Advanced Org. Chem., page 143 and pp. 215–218, Reinhold Pub. Corp., N.Y., 1961.

Pudovik: Chem. Abst., vol. 53, col. 3034i (1959).

Theilheimer: Synthetic Methods of Org. Chem., vol 3, item 362, page 175S, Rarger, N.Y., 1949.

WALTER A. MODANCE, *Primary Examiner.*

A. D. SPEVACK, *Assistant Examiner.*

UNITED STATES PATENT OFFICE
CERTIFICATE OF CORRECTION

Patent No 3,244,707                                           April 5, 1966

Rostyslaw Dowbenko

It is hereby certified that error appears in the above numbered patent requiring correction and that the said Letters Patent should read as corrected below.

Column 6, line 11, for "selcted" read -- selected --; line 45, for "ardicals" read -- radicals --; column 8, line 6, for "2,533,084" read -- 2,533,085 --.

Signed and sealed this 26th day of September 1967.

(SEAL)
Attest:

ERNEST W. SWIDER                                     EDWARD J. BRENNER
Attesting Officer                                             Commissioner of Patents